L. L. ABBOT.
VEHICLE SPRING.
APPLICATION FILED SEPT. 24, 1912.

1,062,872.

Patented May 27, 1913.

WITNESSES

INVENTOR
L. L. Abbot.
Attorney

UNITED STATES PATENT OFFICE.

LEONIDAS L. ABBOT, OF LITTLE ROCK, ARKANSAS.

VEHICLE-SPRING.

1,062,872.  Specification of Letters Patent.  Patented May 27, 1913.

Application filed September 24, 1912. Serial No. 722,043.

*To all whom it may concern:*

Be it known that I, LEONIDAS L. ABBOT, a citizen of the United States, residing at Little Rock, in the county of Pulaski and State of Arkansas, have invented certain new and useful Improvements in Vehicle-Springs, of which the following is a specification.

This invention pertains to vehicle springs and more particularly to an attachment for wagon, buggy or automobile springs.

One of the principal objects of my invention is to provide means for taking up the jar or shock occasioned by a vehicle striking a rut or any foreign substance in the roadway.

A further object is to provide spring means that may be attached to the springs of any vehicle for taking up the jars and shocks and for easing the rebound of the vehicle springs.

Figure 1:
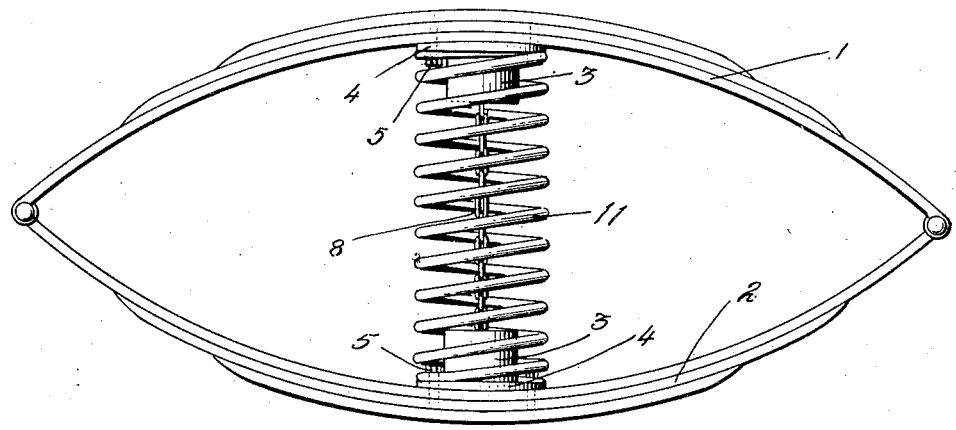
Figure 2:
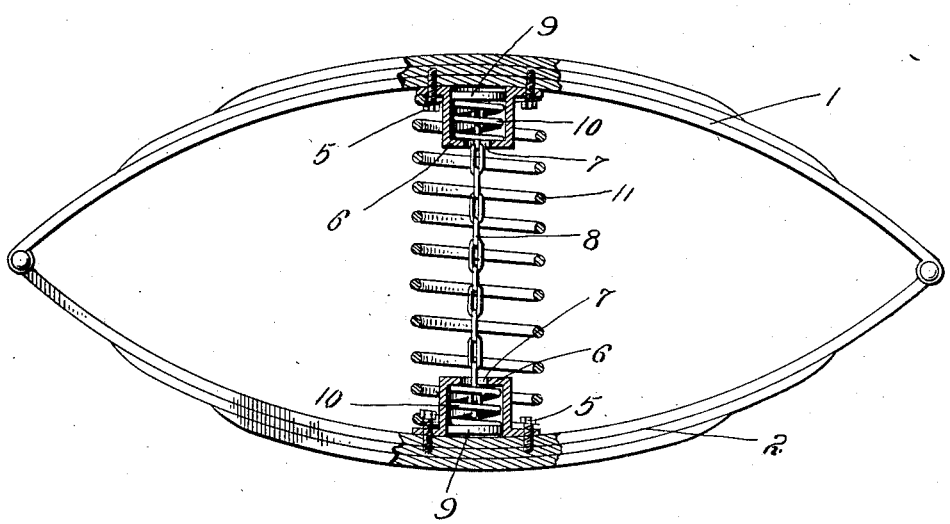

With these and other objects in view the invention consists of the novel construction, combination and arrangement of parts, hereinafter more fully described, pointed out in the appended claims and illustrated in the accompanying drawing in which like reference numerals illustrate like parts throughout and in which, Figure 1 is a side elevation of a vehicle spring embodying my invention. Fig. 2 is a view similar to Fig. 1, partly in elevation and partly in section.

Referring more particularly to the drawing, the preferred embodiment of my invention provides an elliptical spring comprising the upper and lower members, 1 and 2 respectively with hollow cylindrical casings 3. The casings are provided with outwardly extending, integral flanges 4, which abut the inner faces of the members 1 and 2, and are provided with perforations to receive the threaded bolts 5, for securing the casings in oppositely disposed relationship to said members 1 and 2. The free ends of the casings are each provided with an integral cover 6, having a centrally disposed opening 7 therein to allow for the reception and oscillation of a chain 8. The chain is provided at each end with a disk 9 slidably seated in the casings 3 and interposed between the said disks 9 and the inner surface of the cover 6, and surrounding the links adjacent the ends of the chain, are coiled springs 10, adapted to normally hold the disks 9 away from the covers 6 and thus keep the chain 8, taut. It will be noticed that when the spring is in its normal or illustrated position, the springs 10 are in expanded position, and the chain 8 is extended its full length.

Interposed between the flanges of the casings 3 and secured thereto by the identical bolts which secure the flanges is a helical spring 11, adapted to normally exert pressure against the opposite faces of the members 1 and 2 to compensate for any shock or jar occasioned by the vehicle striking any obstruction in the roadway. When the wheel drops into a rut, or hits a stone or foreign substance, the tendency of the spring members 1 and 2 is to come together. By reason of the spring 11 this tendency is offset to some extent and the spring members saved from strain or rupture. As is often the case in the ordinary elliptical spring the rebound causes a great deal of jar and discomfort to the passengers, because the spring members often pass the maximum of their expansion, and thus jerk the wheel off the ground or shake up and jolt the passengers. With my invention when the spring members pass their normal position, on the rebound, the coiled springs 10 are compressed by reason of the covers 6 moving toward the disks 10, and thus the jar and shock of the rebound is taken up and eased.

Although I have described and shown the preferred embodiment of my invention, yet I reserve and may exercise the right to make such changes in the novel construction, combination and arrangement of parts as do not depart from the spirit of the invention and the scope of the appended claims.

Thus having fully described my invention, what I claim as new and desire to secure by Letters Patent is:

1. A vehicle spring of the elliptical type, including a casing secured to each member of the spring, a helical spring interposed between the said spring members, springs seated in the said casings, disks slidably seated in the casings and adapted to bear against the last mentioned springs, and connecting means between the disks substantially as and for the purpose described.

2. In a vehicle spring, the combination of a helical spring interposed between the members of the vehicle spring, with a pair of spiral springs, hollow casings for the reception of said spiral springs, disks bearing against said spiral springs and means for connecting said disks to cause the compression of said spiral springs to lessen the rebound of the said vehicle spring.

3. A vehicle spring of the kind described, including spring members, hollow casings secured to said spring members, coiled springs seated in said hollow casings, disks slidably mounted in said casings and bearing against said coiled springs, a chain connecting said disks, and a helical spring interposed between the members of the vehicle spring, all as and for the purpose described.

In testimony whereof I affix my signature in presence of two witnesses.

LEONIDAS L. ABBOT.

Witnesses:
WILLIAM S. ABBOT,
D. E. GOOD.

Copies of this patent may be obtained for five cents each, by addressing the "Commissioner of Patents. Washington, D. C."